(12) United States Patent  
Wilsher et al.

(10) Patent No.: US 9,288,359 B2  
(45) Date of Patent: Mar. 15, 2016

(54) INTEGRATED PLATEN SCANNER AND DOCUMENT HANDLER FOR A COPIER, MULTIFUNCTIONAL PRINTER OR STANDALONE SCANNING DEVICE

(71) Applicant: XEROX CORPORATION, Norwalk, CT (US)

(72) Inventors: Michael John Wilsher, Herts (GB); Michael Peter Golding, Herts (GB); Roy Norman Gladwin, Bucks (GB)

(73) Assignee: Xerox Corporation, Norwalk, CT (US)

( * ) Notice: Subject to any disclaimer, the term of this patent is extended or adjusted under 35 U.S.C. 154(b) by 102 days.

(21) Appl. No.: 14/107,033

(22) Filed: Dec. 16, 2013

(65) Prior Publication Data

US 2015/0172501 A1    Jun. 18, 2015

(51) Int. Cl.
| | |
|---|---|
| *H04N 1/04* | (2006.01) |
| *H04N 1/10* | (2006.01) |
| *H04N 1/12* | (2006.01) |
| *H04N 1/387* | (2006.01) |
| *H04N 1/203* | (2006.01) |
| *H04N 1/00* | (2006.01) |

(52) U.S. Cl.
CPC ......... *H04N 1/1039* (2013.01); *H04N 1/00559* (2013.01); *H04N 1/1065* (2013.01); *H04N 1/12* (2013.01); *H04N 1/2034* (2013.01); *H04N 1/3877* (2013.01); *H04N 2201/0081* (2013.01); *H04N 2201/0082* (2013.01); *H04N 2201/0094* (2013.01)

(58) Field of Classification Search
CPC .......... H04N 1/00538; H04N 1/00519; H04N 1/00541; H04N 1/00551; H04N 2201/0434; B65H 2405/115; G03G 2215/00282
USPC ......... 358/500, 505, 509, 400, 401, 408, 425, 358/426.01, 443, 450, 474, 486, 494, 496, 358/497, 498; 399/1, 2, 5, 6, 7, 108, 110, 399/151, 361, 362, 363, 364, 365, 367, 374, 399/377, 379, 380, 381, 388
See application file for complete search history.

(56) References Cited

U.S. PATENT DOCUMENTS

| | | | | |
|---|---|---|---|---|
| 5,682,227 | A | * | 10/1997 | Taguchi ............... G03G 15/507 355/25 |
| 5,884,123 | A | | 3/1999 | Stickney et al. |
| 7,800,788 | B2 | * | 9/2010 | Yazawa et al. ................ 358/474 |
| 8,134,757 | B2 | * | 3/2012 | Torimaru ............. G03G 15/602 271/3.01 |
| 2008/0203649 | A1 | * | 8/2008 | Watase et al. ................ 271/9.13 |
| 2009/0174916 | A1 | * | 7/2009 | Ootsuka ................ G03G 15/60 358/498 |
| 2009/0219580 | A1 | * | 9/2009 | Cornell ................ H04N 1/0035 358/474 |
| 2011/0235131 | A1 | * | 9/2011 | Hanamoto ......... H04N 1/00519 358/474 |
| 2013/0214476 | A1 | * | 8/2013 | Asada et al. ................. 271/3.14 |

* cited by examiner

*Primary Examiner* — Mohammad Ghayour  
*Assistant Examiner* — Jonathan R Beckley  
(74) *Attorney, Agent, or Firm* — Ronald E. Prass, Jr.; Prass LLP

(57) ABSTRACT

An integrated document handling and platen scanning apparatus is provided. The apparatus includes a main body; a platen glass positionally fixed to the main body; a CVT glass area positionally fixed to the main body; a first image module attached to the main body, the first image module being movable across the platen glass to scan an image on a first side of a document; a document handler attached to the main body and configured to invert the document and to feed the document across the CVT glass area; and an attachment point on the main body that attaches the main body to a copier body of a photocopier such that the main body, platen glass, first image module, and document handler move as a unit relative to the copier body. The first image module is configured to remain stationary and scan the image on the first side of the document as the document is fed across the CVT glass area.

20 Claims, 4 Drawing Sheets

INTEGRATED PLATEN SCANNER AND DOCUMENT HANDLER FOR A COPIER, MULTIFUNCTIONAL PRINTER OR STANDALONE SCANNING DEVICE

BACKGROUND

The disclosure relates generally to an integrated platen scanner and document handler for use as part of a copier, multifunctional printer or standalone scanning device.

Conventional automatic duplex document sheet handling and imaging systems have increased the effective imaging, scanning, or copying rate for both sides of sets of duplex documents. Such conventional automatic document handlers automatically sequentially feed and image a set or job of plural duplex document sheets, while at the same time, these conventional document handlers are capable of feeding and copying simplex documents. A variety of systems and methods are conventionally used in the scanning operation. In a typical scanning operation, light from the scanner illuminates the surface of an original document and the document moving past an image sensor detects the intensity of light reflected from each location in the image and stores it as a proportionate electrical charge at a corresponding pixel location. Various exemplary scanning devices employ stationary Full-Width Arrays (FWA) or linear Charge-Coupled Device (CCD) arrays. In such systems in which the imaging arrays are stationary, the arrays are often separated from the image to be scanned by a platen glass or other transparent surface or lens overlying the imaging array. The platen glass is positioned on an upper surface of the copier and below (and separate from) the document handler. The scanner's document handler can be a multi-pass configuration with just a platen scanner and inverting mechanism, or a single pass device with a scanner in both the platen and document handler.

Document handlers employ various exemplary methods to move the original document to the transparent surface. One such exemplary method, commonly referred to as Constant Velocity Transport (CVT) scanning, employs a belt, roll, drum or other like device to move the image substrate to be scanned across a linear sensor, such as, for example, Full-Width Arrays (FWA) or linear Charge-Coupled Device (CCD) arrays. One or more scanners, printers, video displays and/or computer storage devices are often connected via a communications network, thereby providing a digital reproduction system. For example, a digital copier may incorporate a scanner and a digital printer.

Configurations as described above having the platen glass positioned on an upper surface of the copier and below and separate from the document handler have several disadvantages. For example, for copying books, the user has to position the book with the pages to be copied faced downward so that they are exposed to the image module located below the platen glass. Thus to copy multiple pages from the book, the user is forced to lift the book off the platen glass, turn the page over and then place the book face down on the platen glass again. This can often cause it to be difficult to properly position the image to be copied. Another disadvantage of this configuration is that the often very bright light from the scanner is directed upward toward the user and, as a result, can make using the copier uncomfortable.

For the reasons stated above, and for other reasons stated below which will become apparent to those skilled in the art upon reading and understanding the present specification, there is a need in the art for a copier that has a moving, or scanning, image module that is directed downward toward the image being copied.

SUMMARY

An integrated platen scanner and document handler is disclosed.

An embodiment of the disclosure includes an integrated document handling and platen scanning apparatus for use with a photocopier, multifunctional printer or standalone scanning device. The apparatus comprises a main body; a platen glass positionally fixed to the main body; a CVT glass area positionally fixed to the main body; a first image module attached to the main body, the first image module being movable across the platen glass to scan an image on a first side of a document; a document handler attached to the main body, the document handler being configured to invert the document and to feed the document across the CVT glass area; and an attachment point on the main body that is adapted to attach the main body to a copier body of the photocopier such that the main body, platen glass, first image module, and document handler move as a unit relative to the copier body. The first image module is configured to remain stationary and scan the image on the first side of the document as the document is fed across the CVT glass area.

Another embodiment of the disclosure includes a copier, comprising: a copier body; an image forming section attached to the copier body; a media supply attached to the copier body; an output tray attached to the copier body and configured to receive media on which an image has been formed by the copier; a surface on an upper area of the copier body; an integrated document handling and platen scanning apparatus having a main body; a platen glass positionally fixed to the main body; a CVT glass area positionally fixed to the main body; a first image module attached to the main body, the first image module being movable across the platen glass to scan an image on a first side of a document; a document handler attached to the main body, the document handler being configured to invert the document and to feed the document across the CVT glass area; and an attachment point on the main body that attaches the main body to the copier body such that the main body, platen glass, CVT glass area, first image module, and document handler move as a unit relative to the copier body. The first image module is configured to remain stationary and scan the image on the first side of the document as the document is fed across the CVT glass area, and the document handling and platen scanning apparatus is movably attached to the copier body such that the apparatus can be moved to a position in which the platen glass is adjacent and parallel to the surface on the upper area of the copier body.

Another embodiment of the disclosure includes a document handling and platen scanning apparatus for use with a photocopier, multifunctional printer or standalone scanning device. The apparatus includes a main body; a platen glass positionally fixed to the main body; a CVT glass area positionally fixed to the main body; a first image module attached to the main body, the first image module being movable across the platen glass to scan an image on a first side of a document; a document handler attached to the main body, the document handler being configured to feed a second side of the document past a separate fixed image module; and an attachment point on the main body that is adapted to attach the main body to a copier body of the photocopier such that the main body, platen glass, first image module, and document handler move as a unit relative to the copier body, this commonly described as a single pass configuration.

Another embodiment of the disclosure includes a copier that includes a copier body; an image forming section attached to the copier body; a media supply attached to the copier body; an output tray attached to the copier body and configured to receive media on which an image has been formed by the copier; a surface on an upper area of the copier body; an integrated document handling and platen scanning apparatus having a main body; a platen glass positionally fixed to the main body; a CVT glass area positionally fixed to the main body; a first image module attached to the main body, the first image module being movable across the platen glass to scan an image on a first side of a document; a document handler attached to the main body, the document handler being configured to feed a second side of the document past a separate fixed image module; and an attachment point on the main body that attaches the main body to the copier body such that the main body, platen glass, first image module, and document handler move as a unit relative to the copier body, this commonly described as a single pass configuration. The document handling and platen scanning apparatus is movably attached to the copier body such that the apparatus can be moved to a position in which the platen glass is adjacent and parallel to the surface on the upper area of the copier body.

DETAILED DESCRIPTION

Illustrative elements are described in detail below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one of implementation to another. Moreover, it will be appreciated that such a development effort might be complex and time-consuming, but would nevertheless be a routine undertaking for those of ordinary skill in the art after having the benefit of the present disclosure.

Aspects of the embodiments disclosed herein relate to integrating platen scanning into a document handler that can be part of a copier or printer. By moving platen scanning from the main body of the copier and moving it to the document handler, many benefits are achieved.

Figure 1:
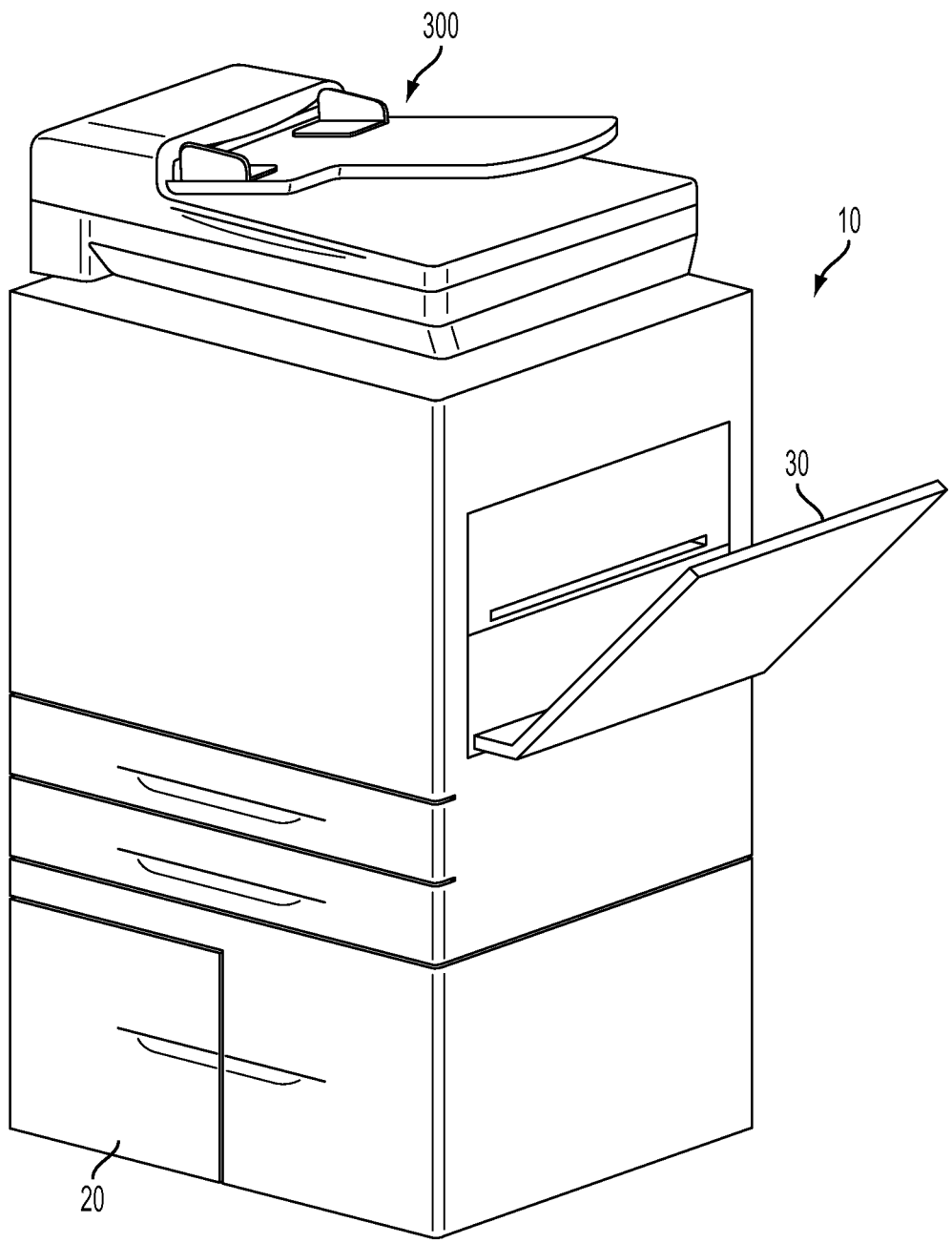
FIG. 1 is an exemplary photocopier in accordance with one possible embodiment of the disclosure.

FIG. 1 shows an example of a copier 10 in accordance with embodiments of the disclosure. Copier 10 has a media supply drawer 20, an output tray 30, and a document handler 300. A sheet of media, for example paper, is fed from supply drawer 20 through an internal image forming mechanism of copier 10 and then fed to output tray 30. Documents can be fed into copier 10 in a number of ways. For example, a document can be loaded into document handler 300 which, in turn, feeds the document past an image module(s) (described below) located in the document handler to read an image on the document.

Figure 2:
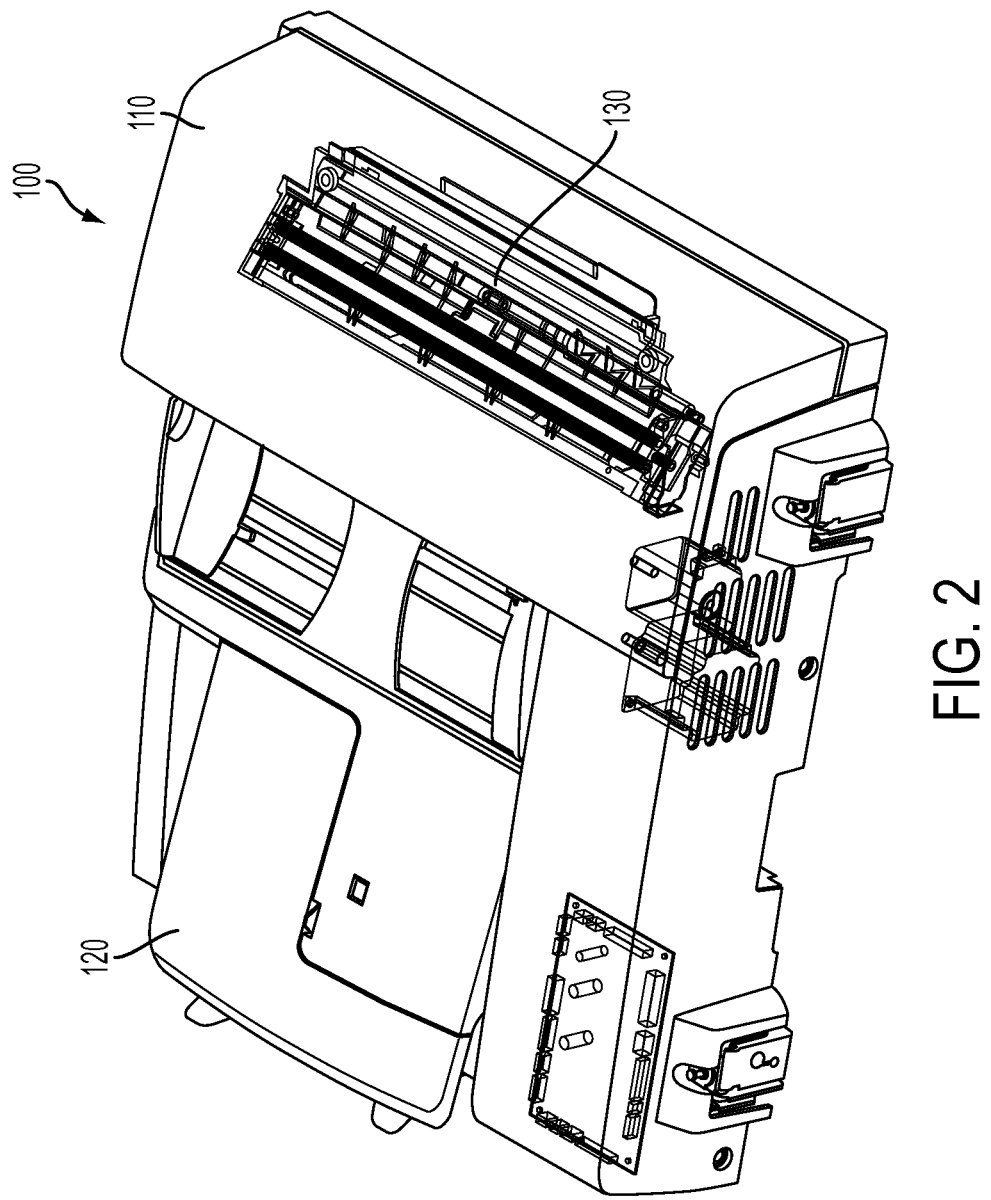
FIG. 2 is an exemplary diagram of a document handler.

FIG. 2 shows an example of a conventional single pass document handling module 100. Document handling module 100 includes a document handler 110 that receives documents from an input tray 120 and feeds them past a stationary image module 130, only applicable to single pass document handlers.

Figure 3:
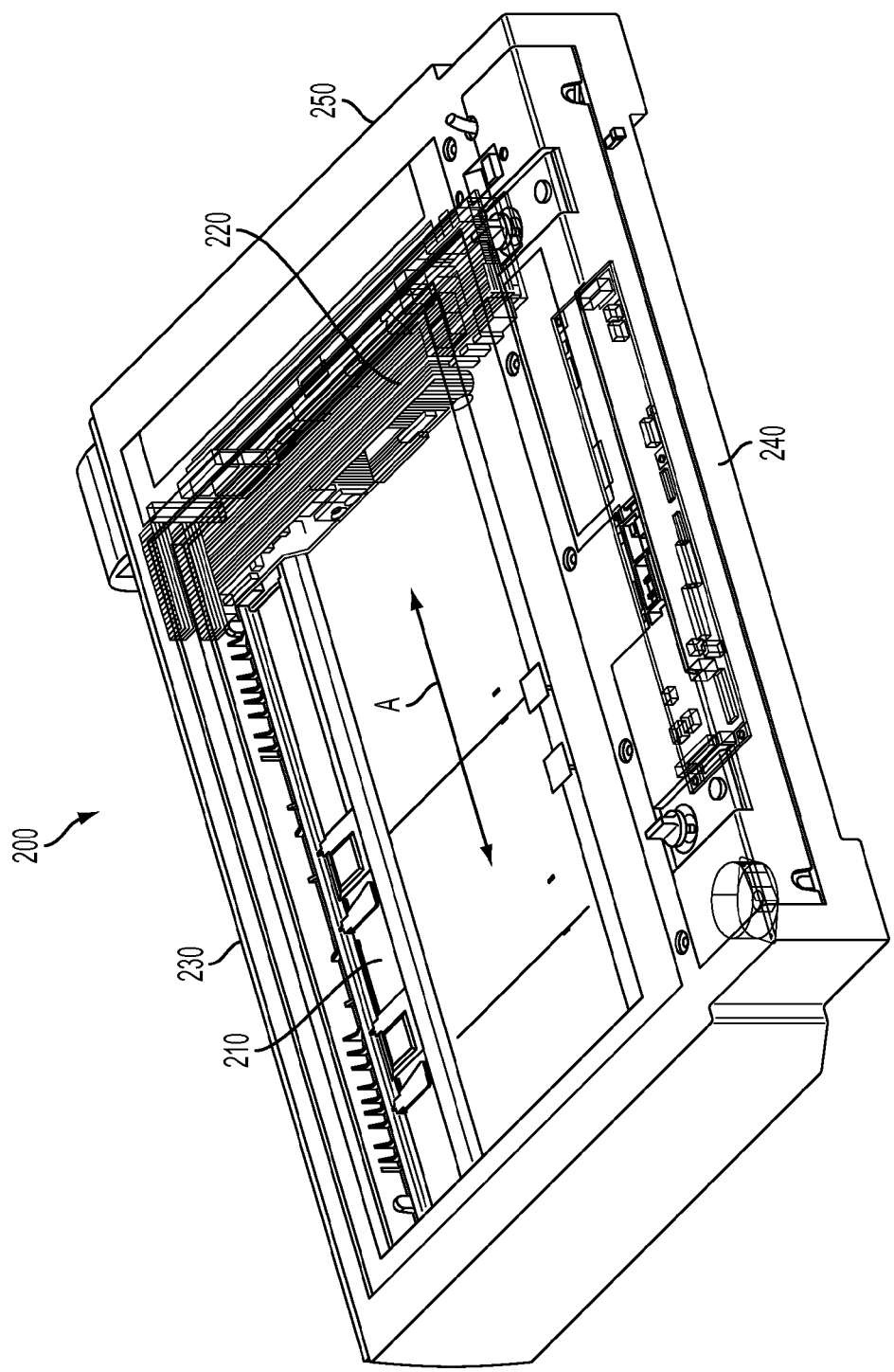
FIG. 3 is an exemplary diagram of a platen scanner.

FIG. 3 shows an example of a conventional platen scanner module 200 that can be located on an upper area of a copier. Platen scanner module 200 has a platen glass 210 on which a document to be copied can be placed. A moving image module 220 is then moved in the direction of arrow A underneath platen glass 210 to scan an image on the document. Platen scanner module 200 has a body 230 that has a rear side 240 and a left side 250 as viewed from the front of the copier. Attachment mechanisms, or hinges, can attach the document handler module 100 of FIG. 2 to the rear side 240 of platen scanner module 200 such that document handler module 100 can be pivoted to an open position such that a document or book can be placed face down on platen glass 210 for copying.

Figure 4:
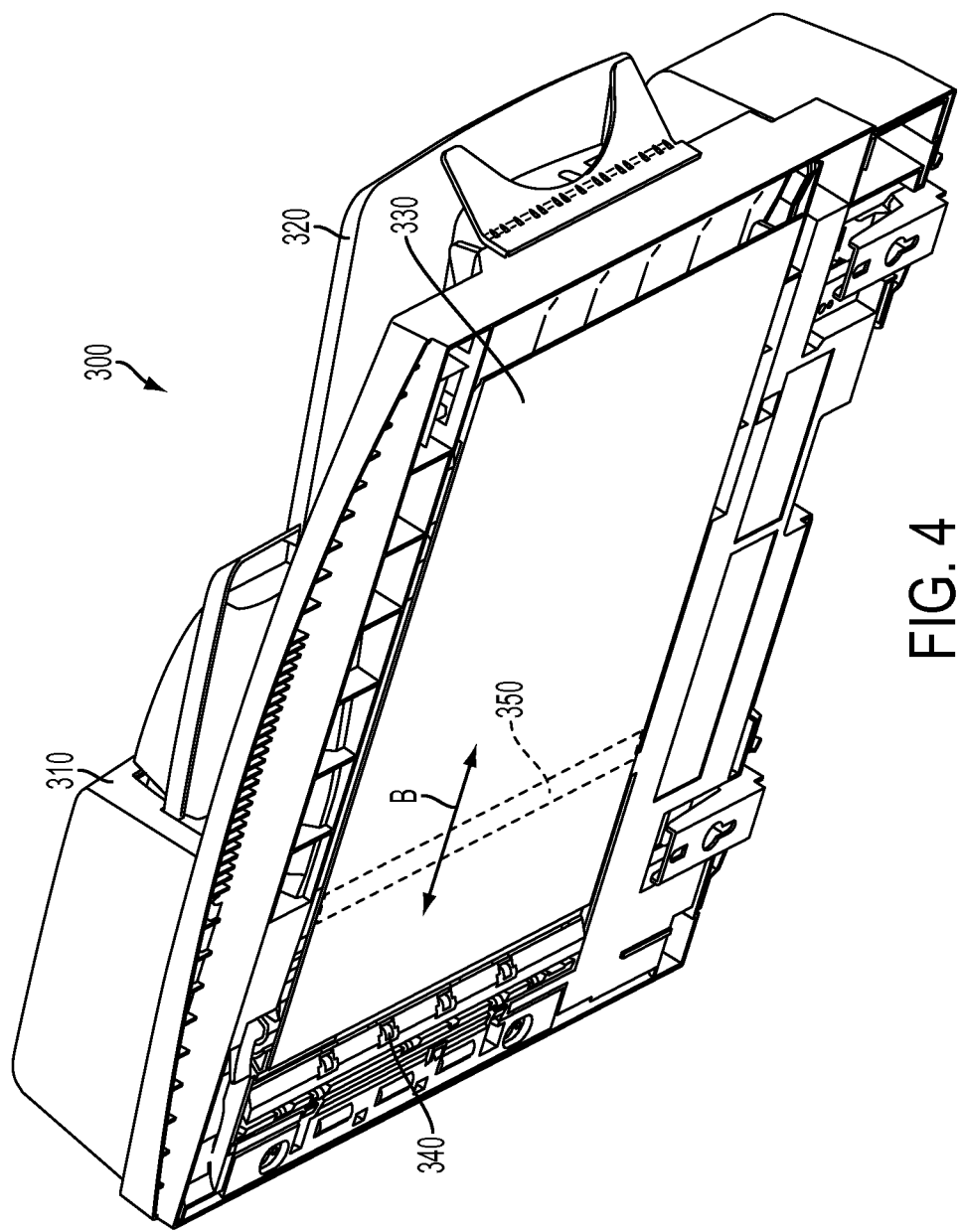
FIG. 4 is an exemplary diagram of an integrated platen and document handler scanner in accordance with one possible embodiment of the disclosure.

FIG. 4 shows an exemplary embodiment of the disclosure. FIG. 4 shows a document handler and scanning apparatus 300 that can be attached to a copier or can be attached to an existing printer to transform the printer into a copier or used as a standalone scanning device mounted onto a separate base. Document handler and scanning apparatus 300 has a document handler 310 and an input tray 320 for holding documents to be fed into document handler 310. On a lower side of document handler and scanning apparatus 300, a platen glass 330 is located. A CVT glass is located either above the plane of platen glass 330 (in the embodiment shown in FIG. 4) or in the same plane as platen glass 330. In embodiments where the CVT glass is in the same plane as platen glass 330, the CVT glass can be located to the left of platen glass 330 in FIG. 4. A moving image module 350 is positioned above platen glass 330 and moves relative to platen glass 330 in the direction of arrow B to scan an image of a document positioned below flat glass 330. Moving image module 350 can alternatively remain stationary above (or otherwise adjacent to) the CVT glass and scan the image of the document as document handler 310 moves the document past the CVT glass. For simplicity, the term "document" will be understood to include anything that is scanned by moving image module 350 including, but not limited to, a sheet of paper, a book, or any other object. It is also noted that document handler 310 may be capable of handling only certain types of documents.

The exemplary embodiment shown in FIG. 4 also includes a stationary image module 340, for single pass configuration only. Some embodiments of the disclosure include only moving image module 350 that can both be moved relative to platen glass 330 and stay stationary relative to the CVT glass, while other embodiments include both moving image module 350 and stationary image module 340. By having both moving image module 350 and stationary image module 340, a document fed past stationary image module 340 can have one side of the document read by stationary image module 340 while the other side of the document is read by moving image module 350 in its stationary position. In this way, simultaneous duplex scanning is possible. In embodiments that include only moving image module 350, a two-sided document can have its first side scanned by moving image module 350, inverted by document handler 310 (or some other method), and then have its second side scanned by moving image module 350 (in either its moving or stationary position).

In some embodiments, moving image module 350 can rotate when a two-sided document is fed through the document handler so that the document never leaves the document handler. In these embodiments, the CVT glass can be positioned above the plane of platen glass 330 so that the document passes by both moving image module 350 (in its stationary position) and stationary image module 340. In some embodiments, the document passes simultaneously by both moving image module 350 (in its stationary position) and stationary image module 340.

Document handler and scanning apparatus 300 can be part of a copier or can be attached to an existing printer to transform the printer into a copier. Because moving image module 350 and platen glass 330 are parts of document handler and scanning apparatus 300, no platen glass or image module need be included as part of the main body of the copier. As a result, the surface (usually an upper surface) of the copier on which document handler and scanning apparatus 300 sits need only be a surface that corresponds in shape to platen glass 330. For example, if platen glass 330 is flat then the surface of the copier need only be a flat surface. In some examples, this surface is an opaque surface, for example, a white opaque surface.

Many benefits are achieved by embodiments of the disclosure as compared to conventional copier configurations because documents scanned by the platen scanner are positioned image side up.

Because the image being scanned is face up, it is easier for a user to position the document so that the desired portion of the image is scanned in the desired orientation. An example in which this is useful is the copying of pages of a book. Conventionally, a book must be positioned face down on the platen glass during copying. Because the image is face down, it is difficult for the user to properly position the book for copying. However, with embodiments of the disclosure a user can see the pages being copied while the book is in the position for copying. In addition, when copying multiple pages of the same book, the pages can simply be turned without disturbing the position of the book. This greatly increases the speed in which a section of a book can be copied.

Generally, faster scanners require brighter illumination. Embodiments of the disclosure result in the illumination pointing down away from the user. This naturally shields the user from the bright illumination.

Because the platen glass is facing down as opposed to being the surface on which the document is placed, the platen glass is less likely to be contaminated by, for example, fingerprints. Also, because the platen glass is not the surface on which a book, for example, is pressed onto during copying, the platen glass of embodiments of the disclosure does not need to be as strong as in a conventional configuration. In addition, because the platen glass is facing down as opposed to being the surface on which the item to be copied is placed, the copier is less likely to be used in ways other than its intended use.

Another benefit of embodiments of the disclosure is that the platen drive motor of a conventional copier can be eliminated because one of the document handler motors can be used to drive moving image module 350.

Embodiments of the disclosure can be added to an existing printer as described above. This allows a user to buy such a printer without copying capability and then, at a later date, purchase a document handler and scanning apparatus such as document handler scanning apparatus 300 to transform the printer into a copier or multifunctional device.

By incorporating moving image module 350 into document handler and scanning apparatus 300, service and replacement of moving image module 350 is simplified because access to the moving image module does not require disassembly of the main body of the copier.

By including moving image module 350 in document handler and scanning apparatus 300, an overall height of the copier can be reduced. This can save on shipping expense because a larger number of copiers can fit into a shipping container. Also, reduced height requirement for the copying mechanism can result in more vertical space being available for paper capacity.

Including moving image module 350 in document handler and scanning apparatus 300, permits the inclusion of all the electronics, cabling, sensors and modules in document handler and scanning apparatus 300 so fewer connections are required between document handler and scanning apparatus 300 and the main body of the copier. Also, the electronics for scanning can all be integrated into one printed circuit board. Additionally, combining the two scanning functions into one allows for reduction in the cost of housing and associated weight. Furthermore, the document handler to the CVT interfaces are now in one module and therefore a reduction of the tolerance constraints across multiple modules is achieved.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. An integrated document handling and platen scanning apparatus for detachable use with a photocopier, multifunctional printer or standalone scanning device; the apparatus comprising:
    a main body;
    a platen glass positionally fixed to the main body;
    a CVT glass area positionally fixed to the main body;
    a first image module attached to the main body, the first image module being movable across the platen glass to scan an image on a first side of a document when the document is stationary;
    a document handler attached to the main body, the document handler being configured to invert the document and to feed the document across the CVT glass area; and
    an attachment point on the main body that is adapted to detachably attach the main body to a device body of the photocopier, multifunction printer or standalone scanning device such that the main body, platen glass, first image module, and document handler are detachable as a unit from the device body and move as a unit relative to the device body,
    wherein the first image module is configured to remain stationary and scan the image on the first side of the document when the document is fed across the CVT glass area.

2. The apparatus of claim 1, further comprising a motor that drives the document handler to feed the document across the CVT glass area.

3. The apparatus of claim 2, wherein the motor also drives the first image module to move it across the platen glass.

4. The apparatus of claim 1, further comprising a second image module attached to the main body,
    wherein the second image module is configured to scan an image on a second side of the document.

5. The apparatus of claim 4, wherein the first image module and the second image module are configured to simultaneously scan the image on the first side of the document and the image on the second side of the document.

6. The apparatus of claim 5, further comprising a motor that drives the document handler to feed the document across the first image module.

7. The apparatus of claim 6, wherein the motor also drives the first image module to move it across the platen glass.

8. The apparatus of claim 4, wherein the second image module is positionally fixed to the main body.

9. A copier, comprising:
a copier body;
an image forming section attached to the copier body;
a media supply attached to the copier body;
an output tray attached to the copier body and configured to receive media on which an image has been formed by the copier;
a surface on an upper area of the copier body;
an integrated detachable document handling and platen scanning apparatus having
a main body;
a platen glass positionally fixed to the main body;
a CVT glass area positionally fixed to the main body;
a first image module attached to the main body, the first image module being movable across the platen glass to scan an image on a first side of a document when the document is stationary;
a document handler attached to the main body, the document handler being configured to invert the document and to feed the document across the CVT glass area; and
an attachment point on the main body that attaches the main body to the copier body such that the main body, platen glass, CVT glass area, first image module, and document handler are detachable as a unit from the copier body and move as a unit relative to the copier body,
wherein the first image module is configured to remain stationary and scan the image on the first side of the document when the document is fed across the CVT glass area, and
the document handling and platen scanning apparatus is movably attached to the copier body such that the apparatus can be moved to a position in which the platen glass is adjacent and parallel to the surface on the upper area of the copier body.

10. The copier of claim 9, wherein the document handling and platen scanning apparatus is attached to the copier body such that the platen glass is positionable parallel to the surface on the upper area of the copier body while at a plurality of different distances from the surface on the upper area of the copier body.

11. The copier of claim 9, wherein the surface on the upper area of the copier body is a flat, opaque surface.

12. The copier of claim 11, further comprising a light source located in the document handling and platen scanning apparatus,
wherein the platen glass is positioned between the light source and the surface on the upper area of the copier body.

13. The copier of claim 11, further comprising a motor that drives the document handler to feed the document across the CVT glass area.

14. The copier of claim 13, wherein the motor also drives the first image module to move it across the platen glass.

15. The copier of claim 9, further comprising a second image module attached to the main body,
wherein the second image module is configured to scan an image on a second side of the document.

16. The copier of claim 15, wherein the first image module and the second image module are configured to simultaneously scan the image on the first side of the document and the image on the second side of the document.

17. The copier of claim 16, further comprising a motor that drives the document handler to feed the document across the CVT glass area.

18. The copier of claim 17, wherein the motor also drives the first image module to move it across the platen glass.

19. The copier of claim 15, wherein the second image module is positionally fixed to the main body.

20. The copier of claim 9, further comprising a second image module positionally fixed to the main body; and
a light source located in the document handling and platen scanning apparatus,
wherein the second image module is configured to scan an image on a second side of the document,
the first image module and the second image module are configured to simultaneously scan the image on the first side of the document and the image on the second side of the document,
the document handling and platen scanning apparatus is attached to the copier body such that the platen glass is positionable parallel to the surface on the upper area of the copier body while at a plurality of different distances from the surface on the upper area of the copier body,
the surface on the upper area of the copier body is a flat, opaque surface, and
the platen glass is positioned between the light source and the surface on the upper area of the copier body.

* * * * *